United States Patent Office 2,915,529
Patented Dec. 1, 1959

2,915,529

METHOD FOR PREPARING GLYCERIN CARBONATE

John Barr Bell, Jr., Little Silver, N.J., and Vernon Arthur Currier and John David Malkemus, Austin, Tex., assignors to Jefferson Chemical Company, Inc., Houston, Tex., a corporation of Delaware No Drawing. Application April 15, 1957
Serial No. 652,692

6 Claims. (Cl. 260—340.2)

The present invention relates to an improved method for preparing monomeric glycerin carbonate from the reaction of glycerin with an organic carbonate.

In accordance with this invention, glycerin is reacted with a carbonate selected from the group consisting of alkylene and dialkyl carbonates at a moderately elevated temperature under alkaline conditions.

Glycerin carbonate is a stable, colorless liquid having value as a solvent and as a chemical intermediate. As a solvent, glycerin carbonate is suitable for preparing solutions of plastics and resins, such as cellulose acetate, nylon, nitro-cellulose and polyacrylonitrile. As a chemical, it reacts readily with phenols, alcohols and carboxylic acids when heated to form the glycerol ethers or esters of these materials. Glycerin carbonate is perhaps most valuable because of its ability to form glycidol on decomposition under controlled conditions. Because glycerin carbonate is stable, although glycidol is relatively unstable, the carbonate represents a safe and readily accessible source of the glycidol.

The art discloses reactions involving glycerin and alkylene carbonates. In general, such reactions have resulted in the production of complex polyglyceryl carbonates. In contrast, the present invention provides a process for preparing monomeric glycerin carbonate. In addition, the present process may be efficiently conducted in extremely short reaction periods.

As indicated above, this process involves the reaction of glycerin with a compound selected from the class consisting of alkylene and dialkyl carbonates at a moderately elevated temperature under alkaline conditions. Although the particular carbonate to be employed is not critical, a monomeric alkylene carbonate having from 2 to 5 carbon atoms in the hydrocarbon radical or a dialkyl carbonate having from 1 to 4 carbon atoms in each hydrocarbon radical is to be preferred. Examples of such compounds, also known as lower alkylene and lower dialkyl carbonates, include diethyl carbonate, ethylene carbonate, propylene carbonate, dimethyl carbonate and the 1,2- and 2,3-butylene carbonates.

The reaction is generally conducted at a moderately elevated temperature normally in the range 80° to about 140° C. When the reaction is conducted in a batch process, prolonged exposure to temperatures above 140° C. should be avoided since extended exposure to higher temperatures causes a pronounced decomposition reaction and reduces the yield of glycerin carbonate. However, when the process is conducted in a continuous operation where the reactants are exposed to reaction conditions for a relatively short period of time, temperatures in the order of 175° C. or above may be employed. For the former method, temperatures within the range of 100° C. to about 130° C. are preferred.

The employment of alkaline conditions is fundamental for the preparation of monomeric glycerin carbonate in high yield and for the realization of such yields in relatively short reaction periods. Thus, tests have shown that the yield of glycerin carbonate under alkaline conditions will be in the order of ten-fold or more over the yield obtained in similar reactions conducted under non-alkaline conditions for the same length of time. These results were quite unexpected since alkaline conditions have previously been known to cause the decomposition of organic carbonates, including glycerin carbonate.

A wide range of alkaline compounds is suitable for producing the desired alkaline conditions. The preferred compounds are the alkali metal hydroxides, carbonates, bicarbonates, phosphates and borates. Examples of such materials include sodium carbonate, sodium bicarbonate, potassium carbonate, potassium bicarbonate, potassium hydroxide, sodium hydroxide, sodium tetraborate, tetrasodium pyrophosphate, trisodium phosphate, lithium hydroxide and lithium carbonate. Other alkaline materials having some solubility in the reaction mixture may be employed.

Usually less than about 1 percent by weight of the alkaline-reacting compound based on the weight of the reactants will produce the desired degree of alkalinity. Generally, between about 0.0001% and about 0.5% by weight will be required. The preferred amount of the alkaline-reacting compound is an amount which will produce an alkaline medium or condition in the reaction mixture having a pH in the range of about 7.5 to about 9. Where pH is referred to in this specification, it means the pH of a dilute aqueous solution. Such a condition may be obtained with about 0.01% by weight of sodium bicarbonate, the preferred catalyst.

The ratio of the alkylene or dialkyl carbonate to glycerin has an important effect on the yield. While the reactants may be reacted in equimolar amounts, it is particularly advantageous to employ the carbonate in substantial excess over the glycerin moiety. A carbonate to glycerin molar ratio of at least 2 mols of carbonate per mol of glycerin is preferred. Ratios in excess of about 5 mols of carbonate per mol of glycerin are uneconomical because of the small proportion of product obtained in relation to the quantity of reactants.

In accordance with a further improvement in this invention, the glycerin introduced into the process may be substantially completely converted to glycerin carbonate by treating the glycerin in a stepwise manner. By so doing, yields of glycerin carbonate in excess of 97% have been realized. Yields in this amount may be obtained by acidifying the reaction product from the principal reaction, distilling the by-product glycol or alcohol from the reaction product thereby leaving a still residue comprising unreacted glycerin, glycerin carbonate and alkylene or dialkyl carbonate, adding, if necessary, an alkylene or dialkyl carbonate so that there is a molar excess of the carbonate over the unreacted glycerin in the residue, alkalizing the residue with an alkaline compound to a pH from about 7.5 to 9, and heating the alkaline residue at a moderately elevated temperature, i.e., from about 80° to about 140° C., to form a second reaction product.

Recovery of the glycerin carbonate from the reaction product in substantially quantitative yield is accomplished by acidifying the reaction product and distilling the by-products therefrom leaving glycerin carbonate as the still residue. For efficient recovery, the reaction product prepared according to this process must be acidified in order to prevent decomposition of the glycerin carbonate during distillation of the by-product materials. The reaction product may be acidified with a minor amount of a suitable acid or acid-forming material. The preferred materials are those acids which are substantially non-volatile during distillation of the by-product materials and which are capable of maintaining a weakly acidic condition. Specific examples of suitable acids include phosphoric acid, sulfuric acid, benzenesulfonic acid, citric acid, mucic acid, saccharic acid, sebacic acid, thapsic acid, and the toluenesulfonic and naphthalenesulfonic acids.

A minor amount of acid, that is an amount sufficient to acidify the reaction product, will permit removal of the by-products and recovery of the glycerin carbonate. In terms of the hydrogen ion concentration, the reaction product must be acidified to a pH between about 2.5 and about 6, perferably 3.5 to 4.5 before distillation of the by-products is undertaken.

Separation and recovery of the glycerin carbonate from the reaction product is best accomplished by vacuum distillation. The reaction product is acidified as described hereinabove and subjected to distillation at temperatures up to about 125° C. and at pressures in the range from about 1 to about 50 millimeters (mm.) of mercury absolute. Distillation under these conditions will remove substantially all of the by-products from the still pot. The glycerin carbonate product is recovered from the pot residue by distillation at pressures about 0.1–0.2 mm. of mercury absolute and at a temperature from about 125°–135° C.

The following examples illustrate the practice of this invention. The amounts of reactants are expressed in parts by weight.

*Example I*

368 parts of glycerin and 704 parts of ethylene carbonate were heated to a temperature of 125° C. at atmospheric pressure and 0.107 parts of sodium bicarbonate by weight (amounting to 0.01% by weight based on the glycerin and ethylene carbonate reactants) added. This reaction mixture had a pH of 8.3 as indicated by a glass electrode. The reactants were held in the temperature range of 125–130° C. for 30 minutes. The resulting reaction product consisting essentially of glycerin, glycerin carbonate, ethylene carbonate and ethylene glycol was acidified with 0.175 parts of 85% phosphoric acid to a pH of 3.9. The acidified mixture was then distilled under reduced pressure to remove the by-products of the reaction. 276 parts of ethylene glycol and ethylene carbonate were taken off overhead. A yield of 81% glycerin carbonate was obtained.

A second part of this example illustrates the additional advantages of treating the reaction product in a combination of steps following distillation of the by-products to obtain glycerin carbonate yields in the order of 97% or above.

The reaction product which remained after distillation of the by-products and which consisted essentially of unreacted glycerin, glycerin carbonate and a molar excess of ethylene carbonate was alkalized with 0.161 part of sodium bicarbonate to a pH of 8.3. The alkalized reaction product was heated at 130° C. for 30 minutes. The final reaction product was acidified with 0.245 part of 85% phosphoric acid to a pH of 3.9. The acidified final reaction product was distilled to a final head temperature of 121° C. at 0.2 mm. (millimeters) of mercury absolute and a pot temperature of 125° C. During the distillation, 326 parts of ethylene glycol and ethylene carbonate were removed overhead. The yield of crude residual monomeric glycerin carbonate amounted to 456 parts or 97% based on the glycerin charge. Redistillation of the crude product resulted in the recovery of 94% of pure monomeric glycerin carbonate based on the glycerin charge.

*Example II*

A reaction mixture, consisting of 100 parts of glycerin and 100 parts of ethylene carbonate was alkalized to a pH of 8.0 by the addition of 0.005% by weight of sodium bicarbonate based on the reactants. This mixture was reacted at a temperature of 130° C. for one hour. Following this, the reaction product was acidified with 85% phosphoric acid to a pH of 2.6 and the by-product materials removed by distillation under reduced pressure. The yield of monomeric glycerin carbonate was found to be 68%.

In contrast to this, a reaction conducted under otherwise similar conditions but in the absence of an alkaline condition, resulted in a substantially lower yield of glycerin carbonate after one hour of reaction. The yield of glycerin carbonate under these conditions approached 68% only after 5 hours of reaction.

*Example III*

2 mols of glycerin and 4 mols of diethyl carbonate were reacted at a temperature of 120° C. and a pH of 7.8 (this was the pH of a 10% aqueous solution) brought about by the addition of 0.126 gram of sodium bicarbonate. After 1.5 hours of reaction under reflux, 0.18 gram of 85% phosphoric acid were added to lower the pH of the reaction mixture to 3.4. Ethanol and diethyl carbonate were stripped from the reaction mixture to a pot temperature of 120° C. at a pressure of 5 mm. of mercury.

The reaction mixture was alkalized with an additional 0.576 gram of sodium bicarbonate to a pH of 7.6. 285 grams of diethyl carbonate were added and the mixture reacted at an initial pot temperture of 112° C. This reaction was conducted over 2½ hours in the temperature range of 90°–112° C. terminating with a final pot temperature of 102° C. Then 0.630 gram of 85% phosphoric acid were added to the reaction production to reduce the pH to 3.5. Ethanol and diethyl carbonate were stripped from the glycerin carbonate to a final pot temperature of 130° C. and a head temperature of 125–130° C. at 0.3 mm. of mercury. The crude glycerin carbonate product weighed 228 grams. Redistillation of this product indicated a yield of 88% based on the glycerin charged.

*Example IV*

A mol of glycerin and a mol of ethylene carbonate were reacted at 130° C. in the presence of a minor amount (about 0.01% by weight based on the reactants) of sodium bicarbonate for 30 minutes. The reaction mixture had a pH of 8. The pH of the reaction product was reduced to 3–4 by the addition of phosphoric acid and the excess ethylene carbonate and ethylene glycol stripped to a head temperature of 130° C. at 0.3–0.5 mm. of mercury. The yield of glycerin carbonate amounted to 68%.

In contrast, a reaction conducted under similar conditions, except that an excess of ethylene carbonate was employed by using a ratio of 2 mols of ethylene carbonate to one mol of glycerin, resulted in the formation of 81% of monomeric glycerin carbonate.

*Example V*

A reaction mixture, consisting of 4,140 grams (45 mols) of glycerin and 7920 grams (90 mols) of ethylene carbonate was made alkaline with 0.574 gram of sodium hydroxide to a pH of 8.2 and heated to 130° C. for 30 minutes. Following this, the reaction product was acidified with 2.3 grams of 85% phosphoric acid to a pH of 3.5 and the by-product materials removed by distillation under reduced pressure. At this point, the reaction was 82% complete as computed by the recovery of ethylene glycol (2,283 grams).

The second part of this example further illustrates the advantages of treating the reaction product in a combination of steps similar to the second part of Example I.

The reaction product which remained after distillation of the by-products and which consisted essentially of unreacted glycerin (8 mols), glycerin carbonate and a molar excess of ethylene carbonate (40 mols total; 23 mols fresh charge) was treated with 0.8 gram of sodium hydroxide (in 3 grams of water) to adjust the pH to 7.7. The alkalized reaction product was heated at 130° C. for 30 minutes. The final reaction product was acidified with 2.3 grams of 85% phosphoric acid to a pH of 3.65. The acidified final reaction product was distilled to a final head temperature of 120° C. at 0.2 millimeter of mercury absolute. During the distillation, 3,408 grams of ethylene glycol and ethylene carbonate were removed overhead. The yield of crude residual monomeric glycerin carbonate amounted to 5,196 grams or 98% based on the glycerin charged. Analysis of the crude glycerin carbonate indicated it to be 97.5% pure.

A portion of the crude product was distilled at 125–135° C./0.1 mm to obtain a distillate which had the following properties;

| | |
|---|---|
| Color (Pt—Co) | 5. |
| Refractive index, $n_D^{20}$ | 1.4583. |
| Specific gravity, $d_4^{20}$ | 1.3985. |
| Viscosity, cs.: | |
| 100° F. | 26.0. |
| 210° F. | 3.4. |
| Molecular weight | 121. |
| Flash point, ° F. | 415. |
| Fire point, ° F. | 420. |
| Freezing point | Supercools to a glass. |
| Pour point, ° F. | —25. |

*Example VI*

A mixture of 368 parts of glycerin and 704 parts of ethylene carbonate was heated to 125° C. and 0.15 part of potassium bicarbonate added to adjust the pH of the mixture to 8. The reaction mixture was then held in the range 125–130° C. for 40 minutes. The product was acidified with 0.20 part of sulfuric acid to a pH of 3.5 and the acidified mixture distilled under reduced pressure to remove the by-product ethylene glycol. The yield of glycerin carbonate was 80% of theory.

Obviously many modifications and variations of the invention, as heretofore set forth, may be made without departing from the spirit and scope thereof, and therefore only such limitations should be imposed as are indicated in the appended claims.

We claim:

1. A process for manufacturing monomeric glycerin carbonate which comprises reacting glycerin with a compound selected from the group consisting of lower alkylene and dialkyl carbonates in the presence of an alkaline compound providing a pH of the reaction mixture of about 7.5 to 9, the reaction being carried out at a temperature of about 80° C. to about 175° C., acidifying the resulting reaction mixture to a pH of about 2.5 to 6, and isolating from the acidified reaction products by distillation monomeric glycerin carbonate as an essential product.

2. A process according to claim 1, wherein the said alkaline compound is selected from the group consisting of the alkali metal hydroxides, carbonates, bicarbonates, phosphates and borates.

3. A process according to claim 2, wherein the alkali metal compound is sodium bicarbonate.

4. A process according to claim 1 in which glycerin is reacted with ethylene carbonate.

5. A process according to claim 1 in which glycerin is reacted with diethyl carbonate.

6. A process for manufacturing monomeric glycerin carbonate which comprises reacting glycerin with a compound selected from the group consisting of lower alkylene and dialkyl carbonates in the presence of an alkaline compound providing a pH in the reaction mixture of about 7.5 to 9, the reaction being conducted at a temperature of about 80° C. to 140° C. to form a reaction mixture consisting essentially of monomeric glycerin carbonate, unreacted glycerin and carbonate compound, and a by-product alcohol, acidifying said reaction mixture to a pH of about 2.5 to 6, distilling under reduced pressure the acidified reaction product with the removal of by-product alcohol to yield a residue containing monomeric glycerin carbonate and unreacted glycerin, adding an alkaline compound to the residue and reacting in the presence of a molar excess of a compound selected from the group consisting of lower alkylene and dialkyl carbonates at a pH of about 7.5 to 9 and a temperature of about 80 to 140° C. until substantially all of said glycerin is converted to monomeric glycerin carbonate, acidifying the resulting reaction mixture to a pH of about 2.5 to 6, and distilling at reduced pressure to remove the excess carbonate compound and by-product alcohol to isolate a monomeric glycerin carbonate product in high yield based on the glycerin charged.

References Cited in the file of this patent

UNITED STATES PATENTS

| | | |
|---|---|---|
| 1,995,291 | Carothers | Mar. 26, 1935 |
| 2,563,771 | Adelson | Aug. 7, 1951 |

OTHER REFERENCES

Wallace H. Carothers and F. J. Van Natta: J. Am. Chem. Soc., vol. 52, pp. 314–326, January 1930.